No. 658,603. Patented Sept. 25, 1900.
W. WAEGEL.
ADVERTISING SCALE.
(Application filed Sept. 7, 1899.)
(No Model.)
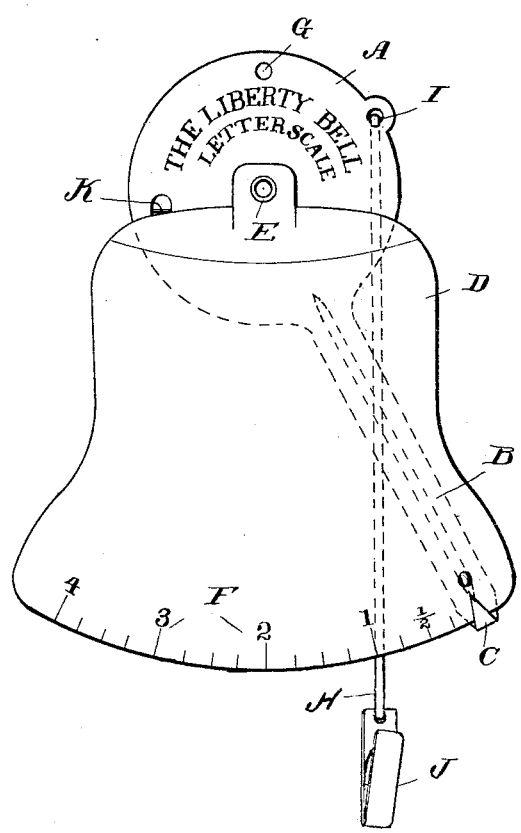
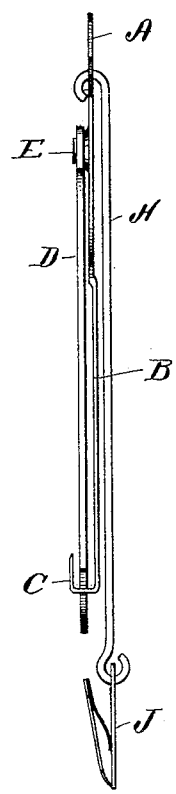
Witnesses
J. S. Williamson
W. W. Williamson.
Inventor
William Waegel
By Geo. C. Hazelton
Atty.

UNITED STATES PATENT OFFICE.

WILLIAM WAEGEL, OF PHILADELPHIA, PENNSYLVANIA, ASSIGNOR OF ONE-HALF TO JOSEPHUS ROBERTS, OF SAME PLACE.

ADVERTISING-SCALE.

SPECIFICATION forming part of Letters Patent No. 658,603, dated September 25, 1900.

Application filed September 7, 1899. Serial No. 729,720½. (No model.)

*To all whom it may concern:*

Be it known that I, WILLIAM WAEGEL, a citizen of the United States, residing at Philadelphia, county of Philadelphia, and State of Pennsylvania, have invented a certain new and useful Improvement in Advertising-Scales, of which the following is a specification.

My invention relates to a new and useful improvement in letter-scales, and has for its object to provide an exceedingly neat, simple, cheap, and effective device of this description which may be suspended from a nail or other object and thereafter will accurately weigh letters or other small articles.

A further object of my invention is to so design and construct the device as to render it especially applicable to advertising purposes.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a front view of the scales made in accordance with my improvement, and Fig. 2 is an edge view thereof.

In carrying out my invention as here embodied I provide a disk A, preferably formed of sheet metal and having extending therefrom a pointer-bar B, which terminates in the hooked-shaped pointer C. To this disk is pivoted the dial-plate D at E, and this dial-plate also serves as the weight, as hereinafter set forth. The pointer embraces the lower edge of the dial-plate, which is preferably in the shape of a bell, having a series of graduations F, with which the pointer C may register. A hole G is formed in the pointer-disk, by which the scales may be suspended from a nail or similar object, and this hole also acts as the pivot-point upon which the pointer swings when the scales are in operation. A rod H engages with the hole I, also formed in the pointer-disk, and the lower end of this rod carries a clasp J or other means for attaching a letter or similar article to the rod, so that the weight thereof will cause the disk to swing upon the pivot-point, (represented by the hole G,) which will cause the pointer to travel along the lower edge of the dial-plate, thereby indicating the weight of the article by the graduation with which the pointer registers. The pointer is caused to stop positively upon the zero-graduation when the weight is suspended from the rod by means of the lug K, which is preferably partially cut from the body of the disk and turned outward to form this stock, as clearly shown.

In the manufacture of my improved scales I prefer that the disk should have its center raised, as indicated at L, so as to give it free movement upon the pivot-point E and prevent the pointer bar or disk from rubbing against the dial-plate.

A scale made in accordance with my improvement offers a large display for advertising matter and is especially adapted to and intended for this purpose, although in practice it has been found to provide an accurate and convenient means for weighing letters and small articles.

Of course I do not wish to be limited to any particular clasp or any particular means for suspending the letters to the rod H, as an ordinary wire loop might be used for that purpose.

The cost of manufacture of a scale made in accordance with my improvement is exceedingly small, since the two principal parts thereof are the disk and dial-plate, both of which may be made from metal or other suitable material and stamped from the sheet by automatic machinery.

Having thus fully described my invention, what I claim as new and useful is—

1. In combination, a disk having a hole by which it may be suspended, a pointer-bar formed with the disk terminating in a hook-shaped pointer, a bell-shaped dial-plate pivoted centrally of the disk and having its lower edge embraced by the hook of the pointer, a lug struck from the disk adapted to engage the upper edge of the dial-plate to limit the movement thereof in one direction, and a rod carrying a clasp pivoted to the disk between the pointer-bar and the aperture for suspending the disk.

2. In combination, a disk having a hole by which it is suspended, a bell-shaped dial-plate having a series of graduations near its lower edge, said disk having a raised center terminating in a pivotal point on which the dial-plate is hung, a pointer-bar formed with the disk, projecting diagonally therefrom and terminating in a hooked pointer embracing the edge of the dial-plate, and a rod for supporting the matter to be weighed pivoted near the periphery of the disk between the support and the pointer-bar.

In testimony whereof I have hereunto affixed my signature in the presence of two subscribing witnesses.

WILLIAM WAEGEL.

Witnesses:
MARY E. HAMER,
E. H. FORSYTH.